(12) United States Patent
Chuang

(10) Patent No.: US 9,920,179 B2
(45) Date of Patent: Mar. 20, 2018

(54) ENCAPSULATION OF FLY ASH BY POLYMERS

(71) Applicant: Steven S. Chuang, Hudson, OH (US)

(72) Inventor: Steven S. Chuang, Hudson, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 15/273,057

(22) Filed: Sep. 22, 2016

(65) Prior Publication Data

US 2017/0081496 A1    Mar. 23, 2017

Related U.S. Application Data

(60) Provisional application No. 62/221,854, filed on Sep. 22, 2015.

(51) Int. Cl.
| | | |
|---|---|---|
| *C08K 3/00* | (2006.01) | |
| *C08K 11/00* | (2006.01) | |
| *C09D 167/06* | (2006.01) | |
| *C09D 133/12* | (2006.01) | |
| *B09B 3/00* | (2006.01) | |

(52) U.S. Cl.
CPC ............. *C08K 3/0033* (2013.01); *B09B 3/00* (2013.01); *C08K 11/00* (2013.01); *C08K 11/005* (2013.01); *C09D 133/12* (2013.01); *C09D 167/06* (2013.01)

(58) Field of Classification Search
CPC .. C09D 167/06; C09D 133/12; C08K 3/0033; C08K 11/00; C08K 11/005; B09B 3/00
See application file for complete search history.

(56) References Cited

U.S. PATENT DOCUMENTS

| 6,916,863 | B2 | 7/2005 | Hemmings | |
|---|---|---|---|---|
| 7,241,818 | B2 | 7/2007 | Hemmings | |
| 7,879,144 | B2 | 2/2011 | Hemmings | |
| 2011/0086933 | A1* | 4/2011 | Herrington | ............. C04B 26/16 521/170 |
| 2015/0267029 | A1* | 9/2015 | Hill | ...................... C08K 3/0033 524/785 |

FOREIGN PATENT DOCUMENTS

| WO | WO-2009007994 A2 * | 1/2009 | ............... C08K 3/26 |
|---|---|---|---|
| WO | WO-2014168633 A1 * | 10/2014 | ........... C08K 3/0033 |

* cited by examiner

*Primary Examiner* — Christopher M Rodd
(74) *Attorney, Agent, or Firm* — Renner Kenner Greive Bobak Taylor & Weber

(57) ABSTRACT

A method for preparing composites of polymer and fly ash particles, wherein the fly ash particles contains heterogeneous compositions of carbon and metal oxides, the method including: the steps of mixing the fly ash particles and an aqueous coating solution, including: a coating component selected from the group consisting of monomers, oligomers, pre-polymers, polymers, and combinations thereof, and an aqueous solvent serving to dissolve the coating component; and, while performing the step of mixing, initiating polymerization or crosslinking or both polymerization and crosslinking of the coating component to at least partially coat the fly ash particles with polymer or a crosslinked polymer network that agglomerates the fly ash particles and coats the surface of the fly ash particles, wherein the polymer or crosslinked polymer network formed in the step of initiating is hydrophobic.

14 Claims, 1 Drawing Sheet

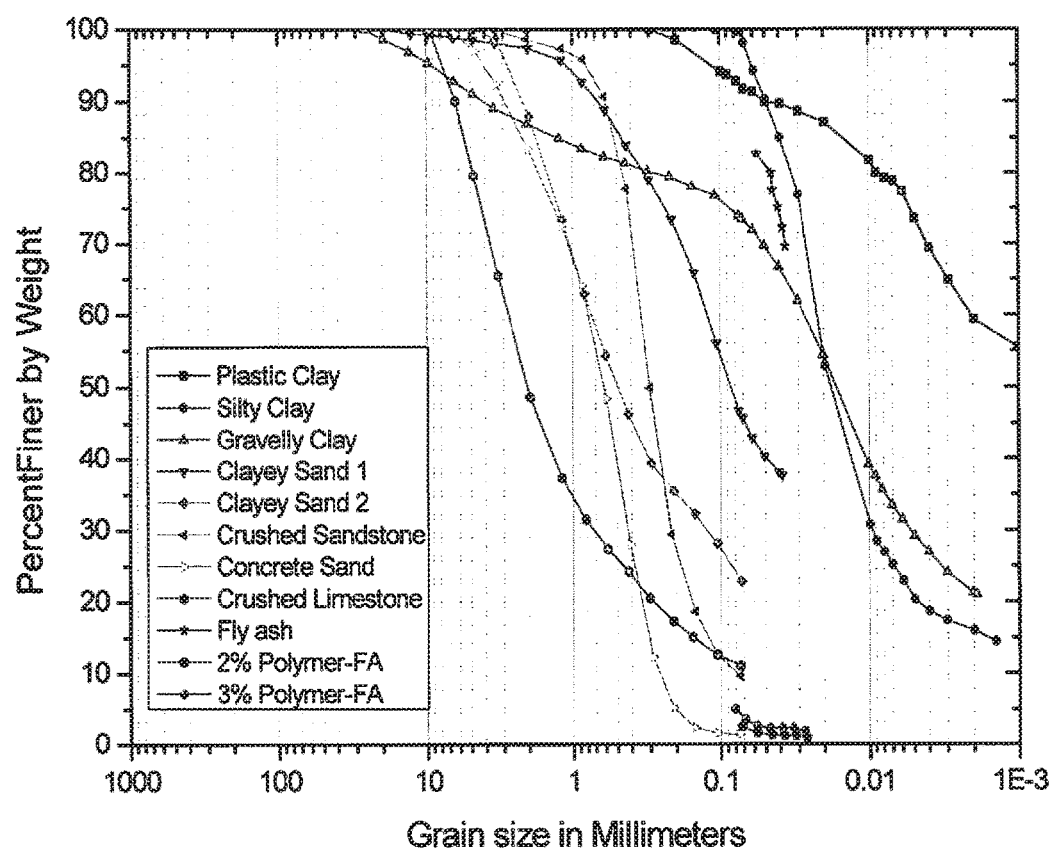

ENCAPSULATION OF FLY ASH BY POLYMERS

CROSS-REFERENCE TO RELATED APPLICATIONS

The present application claims priority to U.S. Provisional Patent Application Ser. No. 62/221,854 filed Sep. 22, 2015, the entirety of which is incorporated herein by reference.

FIELD OF THE INVENTION

The present invention generally relates to a method for preparing agglomerates of polymer and fly ash particles. In some embodiments, the method includes mixing fly ash particles and an aqueous coating solution, wherein the aqueous coating solution includes a coating component and an aqueous solvent. The coating component includes monomer, oligomer, pre-polymer, or polymer or combinations thereof, and is caused to polymerize and/or crosslink to form a polymer or a crosslinked polymer network that agglomerates the fly ash particles and coats the surface of the fly ash particles.

BACKGROUND OF THE INVENTION

Billions of tons of coal-fired power station waste, called fly ash, are dumped in long term landfill sites worldwide each year. High carbon fly ash, which has a carbon content above 1%, has found little commercial use. Most high carbon fly ash is disposed in landfill sites. Because the fly ash has toxic components, use in landfill present a potential environmental risk in light of the potential for leaching of such species.

In contrast, low carbon content fly ash has found many applications in the construction industry. Many companies have transformed low carbon fly ash into valuable eco-minerals on an industrial scale, with no waste stream. Beneficial uses of low carbon content fly ash are found in the cement and concrete industries, which account for over 50% of low carbon fly ash use.

Fly ash has also attracted polymer scientists and engineers. It is mainly used to substitute traditional, more expensive fillers and extenders in the manufacture of polymers, rubbers, coatings and concrete products. Reportedly, these ash-polymer matrices exhibit higher mechanical strength, improved rheological properties, corrosion resistance, reduced aging rate, etc. While fly ash benefits certain polymeric products, polymers also contribute to the advanced utilization of fly ash. For example, polymers have been used as heavy metal stabilizers through chelating reactions for fly ash to reduce the potential health risks.

Despite the many advantages fly ash provides for polymer composites, such beneficial uses are very limited compared to the others, both in academic research and market. Boral Material Technologies Inc. (BMTI) is one of the few companies to commercialize the ash-polymer matrices. BMTI's Celceram™ series are among the several commercial products available in the market. These products are typically used in carpet backings and plastic pipes to reduce the cost of using certain fillers and expanders. Some patents include U.S. Pat. No. 6,916,863, U.S. Pat. No. 7,241,818, U.S. Pat. No. 7,879,144 for the use of fly ash in polymer composites.

Though the analysis of EPA suggests some of the beneficial uses of fly ash are generally safe, numerous lawsuits have been filed against such use in residential applications and production sites of related materials. People complain of suffering adverse health effects after exposure to the fly ash products and show concerns on their carcinogenicity.

There remains a need in the art to make beneficial use of fly ash, and particularly high carbon content fly ash. The present invention provides a method for agglomerating fly ash with polymer or crosslinked polymer network, the agglomerates protecting against leaching of undesirable, toxic species from the fly ash.

SUMMARY OF THE INVENTION

In a first embodiment, the present invention provides a method for preparing composites of polymer and fly ash particles, wherein the fly ash particles contains heterogeneous compositions of carbon and metal oxides. The method comprising the steps of: mixing the fly ash particles and an aqueous coating solution including: a coating component selected from the group consisting of monomers, oligomers, pre-polymers, polymers, and combinations thereof, and an aqueous solvent serving to dissolve the coating component, and, while performing the step of mixing, initiating polymerization or crosslinking or both polymerization and cross-linking of the coating component to at least partially coat the fly ash particles with polymer or a crosslinked polymer network that agglomerates the fly ash particles and coats the surface of the fly ash particles.

In a second embodiment, the present invention provides a method for preparing composites of polymer and fly ash particles, as in the first embodiment, wherein the fly ash particles have a carbon content of 0.75 wt. % or more.

In a third embodiment, the present invention provides a method for preparing composites of polymer and fly ash particles as in either the first or second embodiment, wherein the fly ash particles have oxides selected from the group consisting of (i) $SiO_2$, (ii) $Al_2O_3$, (iii) MgO, (iv) CaO, (v) BaO, (vi) $Se_xO_y$, and (vii) $As_xO_y$.

In a fourth embodiment, the present invention provides a method for preparing composites of polymer and fly ash particles as in any of the first through third embodiments, wherein the fly ash particle a mean particle diameter of less than 1 micrometer.

In a fifth embodiment, the present invention provides a method for preparing composites of polymer and fly ash particles as in any of the first through fourth embodiments, wherein the polymer or crosslinked polymer network formed in the step of initiating is environmentally benign.

In a sixth embodiment, the present invention provides a method for preparing composites of polymer and fly ash particles as in any of the first through fifth embodiments, wherein the coating component is selected from methylmethacrylate, epoxy resin, dialdehydes, polyamine, polyvinyl alcohols, and dicarboxylic/tricarboxylic acid, polyalcohol, and polyols.

In a seventh embodiment, the present invention provides a method for preparing composites of polymer and fly ash particles as in any of the first through sixth embodiments, wherein the aqueous coating solution further includes one or more additive components selected from the group consisting of initiators, catalysts, and curing agents serving to effect the step of initiating.

In an eighth embodiment, the present invention provides a method for preparing composites of polymer and fly ash particles as in any of the first through seventh embodiments, wherein the initiators are selected from the group consisting of azo-initiators, peroxides, and hydroperoxides.

In a ninth embodiment, the present invention provides a method for preparing composites of polymer and fly ash particles as in any of the first through eighth embodiments, wherein the catalysts are selected from the group consisting of (i) tertiary amine for the diamine-epoxy reaction (ii) acid for the reaction of dialdehydes with polyamine and polyvinyl alcohols, and for the reaction of dicarboxylic/tricarboxylic acid with polyamine, polyalcohol, polyols, and polyvinyl alcohols.

In a tenth embodiment, the present invention provides a method for preparing composites of polymer and fly ash particles as in any of the first through ninth embodiments, wherein the curing agents are selected from the group consisting of diamines for epoxy, dialdehydes for polyamine and polyvinyl alcohols, dicarboxylic and tricarboxylic acid for polyamine, polyalcohol, polyols, and polyvinyl alcohols.

In an eleventh embodiment, the present invention provides a method for preparing composites of polymer and fly ash particles as in any of the first through tenth embodiments, wherein the aqueous coating solution further includes a low toxicity surfactant that increases the wettability of the coating component on the fly ash particle.

In a twelfth embodiment, the present invention provides a method for preparing composites of polymer and fly ash particles as in any of the first through eleventh embodiments, further comprising wherein the molar concentration of the coating component in the aqueous solvent is less than 50 wt. %.

In a thirteenth embodiment, the present invention provides a method for preparing composites of polymer and fly ash particles as in any of the first through twelfth embodiments, wherein the aqueous solvent is ethanol and water, with ethanol concentration less than 20%.

In a fourteenth embodiment, the present invention provides a method for preparing composites of polymer and fly ash particles as in any of the first through thirteenth embodiments, wherein the polymer or crosslinked polymer network formed in the step of initiating is hydrophobic.

In a fifteenth embodiment, the present invention provides a method for preparing composites of polymer and fly ash particles as in any of the first through fourteenth embodiments, wherein the step of initiating forms a first composite, the method further comprising the steps of: mixing the first composite and an aqueous coating solution including: a coating component selected from the group consisting of monomers, oligomers, pre-polymers, polymers, and combinations thereof, and an aqueous solvent serving to dissolve the coating component; and, while performing the step of mixing, initiating polymerization or crosslinking or both polymerization and crosslinking of the coating component to at least partially coat the first composite with polymer or a crosslinked polymer network that agglomerates the first composite and coats the surface of the first composite.

In a sixteenth embodiment, the present invention provides a polymer and fly ash composite as in any of the first through fifteenth embodiments, wherein the polymer and fly ash composite comprises a plurality of fly ash particles, wherein the fly ash particles contain heterogeneous compositions of carbon and metal oxides, and a polymer or crosslinked polymer network surrounding and encapsulating the plurality of fly ash particles, the crosslinked polymer network comprising a coating component and an aqueous coating solution, wherein the weight ratio of polymer or crosslinked polymer network to fly ash is 1:2300 to 1:1.

In a seventeenth embodiment, the present invention provides a polymer and fly ash composite as in any of the first through sixteenth embodiments, wherein the polymer and fly ash composite forms an agglomerate, the agglomerate including a weight ratio of polymer to fly ash of 1:50 or less.

In an eighteenth embodiment, the present invention provides a polymer and fly ash composite as in any of the first through seventeenth embodiments, wherein the polymer and fly ash composite forms a structural composite, the structural composite including a weight ratio of the polymer or crosslinked polymer network to fly ash particles 1:50 or more.

BRIEF DESCRIPTION OF THE DRAWINGS

FIG. 1 is a particle size distribution of various materials, and comparing to fly ash and two different fly ash/polymer composites according to this invention.

DETAILED DESCRIPTION OF ILLUSTRATIVE EMBODIMENTS

The present invention provides a method for preparing composites of polymer and fly ash particles, wherein the fly ash particles contains heterogeneous compositions of carbon and metal oxides. The present invention also provides novel composites of fly ash particles and polymer. These composites can include that are referred to herein as "agglomerates" (also referred to using like terms), which contain a lesser amount of polymer as compared to other composites herein that are referred to as "structural composites."

The method includes mixing fly ash particles and an aqueous coating solution, the aqueous coating solution including a coating component and an aqueous solvent. The coating component is selected from the group consisting of monomers, oligomers, pre-polymers, polymers, and combinations thereof. The aqueous coating solution is chosen to dissolve the coating component.

Herein, pre-polymer refers to a monomer or system of monomers that have been reacted to an intermediate molecular mass state. This material is capable of further polymerization by reactive groups to a fully cured high molecular weight state. They can broadly still be classified for purposes herein as monomers.

The coating component and aqueous coating solution are mixed to provide a uniform mixture, and, while mixing, polymerization or crosslinking or both are initiated. This creates polymer or a crosslinked polymer network, as the case may be, and the polymer or crosslinked polymer network at least partially coats the surface of the fly ash particles and causes the fly ash particles to form a composite, whether an agglomerate or structural composite, as will be understood more fully below.

In some embodiments, the fly ash has a high carbon content, which is to be understood as a carbon content of greater than or equal to 1% by weight. In other embodiments the carbon content is greater than or equal to 1.5%, in other embodiments, the carbon content is greater than or equal to 2%, in other embodiments, greater than or equal to 5%, or in other embodiments, greater than or equal to 10%.

In some embodiments, the fly ash has a high carbon content that is less than or equal to 30%, in other embodiments, the carbon content is less than or equal to 25%, in other embodiments, less than or equal to 20%, or in other embodiments, less than or equal to 15%, in other embodiments, less than or equal to 15%, in other embodiments, less than or equal to 10%.

The fly ash particles 2 contain different species of metal oxides. In some embodiments, the metal oxides include one or more of (i) $SiO_2$, (ii) $Al_2O_3$, (iii) $MgO$, (iv) $CaO$, (v) $BaO$, (vi) $Se_xO_y$, and (vii) $As_xO_y$.

In some embodiments, the fly ash particles have a mean particle diameter of less than 10 micrometers. In other embodiments, the fly ash particles have a mean particle diameter of less than 8 micrometer, in other embodiments, less than 6 micrometers, in other embodiments, less than 4 micrometers, in other embodiments, less than 2 micrometers, and in other embodiments, less than 1 micrometer.

In some embodiments, the polymer or crosslinked polymer network formed in the step of initiating is environmentally benign. In some embodiments, the polymer or crosslinked polymer network formed in said step of initiating is hydrophobic. That is, the coating component is selected with one or more of these properties of the end product in mind.

In some embodiments the coating component is selected from methylmethacrylate, epoxy resin, and poly(acrylic acid) or esters), poly(vinyl alcohol), poly(ethylene glycol), and poly (hydroxyethyl methacrylate).

In some embodiments, the chosen monomers, oligomers, pre-polymers, and polymers of the coating component include a functional group selected from the group consisting of (i) amine, (ii) hydroxyl, (iii) carboxylic, and (iv) nitrile functional groups.

In some embodiments, when the functional groups are amine, the additive component catalyst is a tertiary amine.

In some embodiments, when the functional groups are carboxylic acid the additive component catalyst is an acid.

Use of coating components consisting of MMA (methyl methacrylate) monomer and AIBN (Azobisisobutyronitrile) initiator leads to the formation of poly(methyl methacrylate) polymer.

Use of coating components consisting of monomer with epoxide functional groups and amines leads to the formation of epoxy polymer.

Use of coating components consisting of alcohols (or polyols or polyvinyl alcohol) and organic acid such as citric acid leads to the formation of polyester polymer, Use of coating components consisting of dialdehyde and amine leads to the formation of polymer containing imine functional group.

Use of coating components consisting of dialdehyde and polyols or polyvinylalcohol ads to the formation of polymer containing acetal and hemi-acetal function group.

Use of coating components consisting of amine, monomer with epoxide, and methyl methacrylate lead to the formation of a copolymer with a high mechanical strength As noted, the method involves a polymerization or crosslinking step or both said steps. As such, the aqueous coating solution further includes one or more appropriately selected additive components selected from the group consisting of initiators, catalysts, and curing agents serving to effect said step of initiating. Depending on the coating component, the additives are chosen to achieved the desired polymerization or crosslinking, as will be apparent from representative examples. For example, when an epoxy resin (pre-polymer) is employed as the coating component, a suitable amine, acid, acid anhydride, phenol, alcohol, or thiol could be employed as a curing agent to achieve a desired crosslinked polymer network.

Initiators will be used when it is desired to polymerize the coating component, and, depending upon the monomer and/or oligomers and/or pre-polymers employed, different initiators will be found useful. Some will be heat activated, such as with azo-initiators, peroxides, and hydroperoxides.

In some such embodiments the heat is raised gradually to the appropriate activation temperature for heat activated initiators.

In some embodiments, the initiators are selected from the group consisting of azo-initiators, peroxides, and hydroperoxides.

The initiator will be used in an amount sufficient to achieve a desired polymerization rate and target molecular weight. In some embodiments, the initiator is present at from 2 wt. % or less, with the weight percent being based upon the amount of initiator and coating component employed.

Similarly, catalysts can assist in polymerization and/or crosslinking reactions, and are chosen depending upon the monomers and/or oligomers and/or pre-polymers and/or polymers employed in the coating component. In some embodiments, the catalysts are selected from the group consisting of (i) tertiary amine for the diamine-epoxy reaction, (ii) acid for the reaction of dialdehydes with polyamine and polyvinyl alcohols, and for the reaction of dicarboxylic/tricarboxylic acid with polyamine, polyalcohol, polyols, and polyvinyl alcohols. Catalysts can be employed to accelerate the rate of polymerization at a desired temperature.

Curing agents will be used when it is desired to create a crosslinked polymer network of the coating component, and, depending upon the monomer and/or oligomers and/or pre-polymers and/or polymers employed, different curing agents will be found useful.

Curing agents can be selected based on their water solubility. In some embodiments, curing agents can be normally non-water soluble but converted to be water soluble by reaction with a water soluble molecule. Desirable curing agents may contain an epoxy, aldehyde, or silane functional groups. In some embodiments, the curing agent is an aminosilane.

In some embodiments, curing agents are selected from the group consisting of amines, acids, acid anhydrides, phenols, alcohols and thiols. In some embodiments, curing agents are selected from the group consisting of amines, aldehydes, and polyvinyl alcohols. In some embodiments, curing agents are selected from the group consisting of diamines for epoxy coating components, in other embodiments, dialdehydes for either polyamine or polyvinyl alcohol coating components, and in other embodiments, dicarboxylic and tricarboxylic acid for polyamine, polyalcohol, polyols, and polyvinyl alcohol coating components.

In some embodiments, the aqueous coating solution employs a low toxicity surfactant. It should be appreciated that the low toxicity surfactant is selected to increase the wettability of the coating component on the fly ash particle. The surfactant employed can control the thickness of the coating component and the interactions between the coating component and the surface of the fly ash particles.

The surfactant selected can be either nonionic or ionic. In some embodiments, nonionic surfactants may be selected from fatty alcohols, methyl celluloses, and poloxamers. In some embodiments, anionic surfactants may be selected from those containing sulfate functional groups.

In some embodiments, surfactants are selected depending upon the composition of the coating component. Surfactants can be selected according to their ability to wet the fly ash surface with water, toxicity, and cost. The ability of the surfactant to wet surface can determined by measuring the contact angle of surfactant/water droplet on the fly ash thin disc prepared by hard pressing in a die with hydraulic press. The surface of this disc is treated with the surfactant and the contact angle of a droplet of water thereon is measured, as well known. In some embodiments, the contact angle achieved by use of the surfactant is less than 30°. In some embodiments, the contact angle is less than 25°, in other embodiments, less than 20°, and, in other embodiments, less than 15°. In some embodiments, the contact angle achieved by use of the surfactant is greater than 2°, in other embodiments, greater than 5°, in other embodiments, greater than 7°, and, in other embodiments, greater than 10°.

In some embodiments, surfactants are employed at less than 3 wt. % of the aqueous coating solution.

In some embodiments, the aqueous solvent can be selected from water and water and alcohol mixtures. The aqueous solvent serves to dissolve the coating component. In some embodiments, the aqueous solvent is alcohol and water, with the alcohol content being 25% or less. In other embodiments, the aqueous solvent is alcohol and water, with the alcohol content being 20% or less, in other embodiments, 15% or less, and, in other embodiments, 10% or less. In some embodiments, the alcohol serves to dissolve components that contain hydrophobic functional groups. In some embodiments, as described herein, hydrophobic functional groups are added to reagents that are otherwise not water soluble. The alcohol may be selected from ethanol, isopropyl alcohol, and methanol. In some embodiments, the aqueous solvent is ethanol and water, and the ethanol concentration is less than 20%.

In some embodiments, the coating component in the aqueous solvent is 50 wt. % or less. That is, taking only the mass of the solvent and the mass of the coating component into account, the coating component is 50 wt. % (and, thus, the solvent is 50 wt. %). In some embodiments, this percentage is 25% or less, in other embodiments 20% or less, in other embodiments, 15% or less, in other embodiments, 10% or less, in other embodiments, 5% or less, in other embodiments, 1% or less, in other embodiments, 0.75% or less, in other embodiments, 0.5% or less, in other embodiments, 0.25% or less.

In some embodiments, this percentage is 0.05% or more, in other embodiments 0.1% or more, in other embodiments, 0.25% or more, in other embodiments, 0.5% or more, in other embodiments, 0.75% or more, in other embodiments, 1% or more, in other embodiments, 5% or more, in other embodiments, 10 or more, and in other embodiments, 15% or more.

In some embodiment, the concentration of coating components in the aqueous solvent is in the range of about 0.05 wt. % to about 1 wt. %. In other embodiments, the concentration of coating components in the aqueous solvent is in the range of about 1 wt. % to about 10 wt. %, and in other embodiments, in the range of about 10 wt. % to about 50 wt. %.

In some embodiments, the weight ratio of coating component to aqueous solvent is 1:50 or less, in other embodiments, 1:100 or less, in other embodiments, 1:200 or less, in other embodiments, 1:500 or less, in other embodiments, 1:750 or less, in other embodiments, 1:1000 or less, in other embodiments, 1:1250 or less, and, in other embodiments, 1:1500 or less. In some embodiments, the weight ratio of coating component to aqueous solvent is 1:2000 or more, in other embodiments, 1:1900 or more, in other embodiments, 1:1750 or more, in other embodiments, 1:1500 or more, in other embodiments, 1:1250 or less, in other embodiments, 1:1000 or less, in other embodiments, 1:750 or less, and, in other embodiments, 1:500 or less. In some embodiments, the ratio of coating component to the aqueous solvent is in the range of 1:2000 to 1:50. In other embodiments, the ratio of coating component to the aqueous solvent is in the range of 1:1000 to 1:100.

The type of composite formed can be affected by the concentration of the coating component. With a dilute coating component in the aqueous solvent (low molarity) the composite fly ash product tends to be in the range of 10 to 100 micrometers in diameter. With higher concentrations of coating component in the aqueous solvent, the composite fly ash product tends to be 50 to 180 micrometers in diameter.

One aspect of the present invention is the manufacturing of agglomerated particles. In such embodiments, agglomerates are formed using a lesser amount of polymer/crosslinked polymer network. In such embodiments, agglomerates can be formed by encapsulating fly ash particles to provide an effective solution to the disposal problems encountered with fly ash particles, in particular high carbon fly ash particles. Such agglomerates are useful to prevent leaching from fly ash particles, as well as to remove fly ash from industrial systems.

In such embodiments, the desired weight ratio of polymer to fly ash for manufacturing of agglomerated particles is 1:2300 or more. In other embodiments, the desired weight ratio polymer to fly ash for manufacturing of agglomerated particles is 1:2000 or more, in other embodiments, 1:1750 or more, in other embodiments, 1:1500 or more, in other embodiments, 1:1100 or more, in other embodiments, 1:850 or more, in other embodiments, 1:500 or more, in other embodiments, 1:250 or more, in other embodiments, 1:100 or more, in other embodiments, 1:75 or more, and in other embodiments, 1:50 or more, with 1:50 serving as a upper boundary for agglomerate formation. In some embodiments, the ratio is less than 1:50. In other embodiments, the desired weight ratio polymer to fly ash for manufacturing of agglomerated particles is 1:50 or less, in other embodiments, 1:75 or less, in other embodiments, 1:100 or less, in other embodiments, 1:250 or less, in other embodiments, 1:500 or less, in other embodiments, 1:850 or less, in other embodiments, 1:1100 or less, in other embodiments, 1:1500 or less, in other embodiments, 1:1750 or less, and in other embodiments, 1:2000. In some-embodiments, the desired weight ratio polymer to fly ash for manufacturing of-agglomerated particles is in the range from 1:500 to 1:2000.

One aspect of the present invention is the manufacturing of a structural composite. In such embodiments, structural composites are formed using agglomerated particles and a more concentrated amount of polymer. In such embodiments, structural composites can be used to increase the mechanical strength of structural materials.

In such embodiments, the weight ratio of final polymer or crosslinked polymer network to fly ash particles for manufacturing structural composite is 1:50 or more. In other embodiments, the weight ratio of final polymer or crosslinked polymer network to fly ash particles employed is 1:33 or more, in other embodiments, 1:3 or more, in other embodiments, 1:2 or more, and in other embodiments, 1:1. In some embodiments, the weight ratio of final polymer or crosslinked polymer network to fly ash particles employed is 1:1 or less, in other embodiments, 1:2 or less, in other embodiments, 1:3 or less, and, in other embodiments, 1:33 or less.

The ratio of polymer to fly ash will affect the properties of the composite formed. In general, as the amount of polymer increases, the composites formed are larger (in mean diameter) and stronger (mechanical strength). Initial ratio of monomer to fly ash (i.e., high carbon fly ash) can be considered to be the same as the ratio of polymer to ash in the final products when considering systems that do not employ an additive component that appreciable affects the resultant weight of the polymer or crosslinked polymer network that is produce. Thus, for systems employing a reactive curing agent that becomes incorporated into the crosslinked polymer network, the initial ratio of coating component and curing agent can be considered to be the same as the ratio of polymer to ash in the final product.

To provide general trends by way of looking at specific examples, in some embodiments, when the weight ratio of final polymer or crosslinked polymer network to fly ash particles is 1:50 or less, a composite with a submicrometer thickness of coating component is formed. The composite may be used for the reduction of water use in dust control, or sequestration of heavy metal leachates in a landfill disposal and mine reclamation. In some embodiments, when the weight ratio of final polymer or crosslinked polymer network to fly ash particles is 1:33, the composite may form particles of about 200-300 micrometers in diameter and can be useful in paving for road construction. In some embodiments, when the weight ratio of final polymer or crosslinked polymer network to fly ash particles is 1:3, the composite has appreciable mechanical strength and can be utilized in low strength, light weight composites. In some embodiments, when the weight ratio of final polymer or crosslinked polymer network to fly ash particles employed is 1:2, the composite has even higher strength and can be utilized in high strength, light weight composites.

It should be appreciated that the step of mixing is employed to achieve a uniform mix of the fly ash and coating component and any necessary additive components or desired surfactants. The method of mixing the fly ash, coating component, additive component, and any desired surfactant in the aqueous solvent can be achieved in a variety of ways. It will be appreciated that the initiation of polymerization and/or crosslinking will occur in different ways for different embodiments, depending upon the nature of the coating components and the additive components. For example, in some embodiments, wherein a photo-initiated or heat-initiated polymerization or crosslinking is practiced, the components can all be mixed to await application of light or heat sufficient to begin polymerization/crosslinking. However, in embodiments where reactive components result in crosslinking, as with epoxy resin, and, for example, a diamine curing agent, the mixture can contain all components, but for the diamine, with the diamine being added only when it is desired to start the crosslinking.

In some embodiments, the step of mixing can be achieved by spraying the aqueous coating solution onto fly ash. In other embodiments, the step of mixing can be achieved by mixing the fly ash directly into the aqueous coating solution in an appropriate mixing vessel. In other embodiments, various components can be mixed in a step-wise manner, which is particularly useful when employing curing agents that initiate reaction directly upon being mixed with the coating component.

In should be appreciated that the step of initiating polymerization and/or crosslinking can take place by different approaches mandated by the type of initiator or curing agent and the coating component. In some embodiments, polymerization is based on temperature. The step of initiating polymerization and crosslinking of the coating component may take place at room temperature.

In some embodiments, when increasing the temperature of the mixture to initiate polymerization with a temperature-based initiator, the temperature is raised gradually. This is practiced when rapid heating has the potential to produce gas bubbles, which would be detrimental to the structure of the final product, as gas bubbles produced during mixing can affect mechanical strength. In some embodiments, the temperature is gradually raised at about 2° C./min or less. In some embodiments, the temperature is gradually raised at about 1° C./min or less.

It has also been found useful to first form a agglomerate (with lesser amount of polymer/crosslinked polymer network, as already described above), and then form a structural composite using the agglomerate in the same method but in place of the fly ash. Thus, an embodiment of this invention provides a method for preparing composites of polymer and fly ash particles, wherein the fly ash particles contain heterogeneous compositions of carbon and metal oxides. The method includes mixing the fly ash particles and an aqueous coating solution, the aqueous coating solution including a coating component selected from the group consisting of monomers, oligomers, pre-polymers, polymers, and combinations thereof, and an aqueous solvent serving to dissolve the coating component. While mixing polymerization or crosslinking or both polymerization and crosslinking of the coating component is initiated to at least partially coat the fly ash particles with polymer or a crosslinked polymer network that agglomerates the fly ash particles and coats the surface of the fly ash particles. This mixing and polymerization/crosslinking a first composite, and the method further includes mixing this first composite and an aqueous coating solution including a coating component selected from the group consisting of monomers, oligomers, pre-polymers, polymers, and combinations thereof, and an aqueous solvent serving to dissolve the coating component. While mixing, mixing polymerization or crosslinking or both polymerization and crosslinking of the coating component is initiated to at least partially coat the first composite with polymer or a crosslinked polymer network that agglomerates the first-composite and coats the surface of the first composite.

In a specific embodiment, the coating component is methylmethacrylate (MMA), and an AIBN (Azobisisobutyronitrile) initiator is employed. The MMA and fly ash are mixed in water, with the MMA:water weight ratio being from 1:1 to 1:20; and the MMA:fly ash weight ratio ranging as provided above whether for agglomerate formation or structural composite formation. While mixing, the initiator is added at from 0.25 to 0.5 wt. % of the MMA. Polymerization is initiated upon the application of heat. In some such embodiments the heat is raised gradually to the appropriate activation temperature for the initiator, here, generally above 60° C.

In a specific embodiment, the coating component is epoxy resin, and a curing agent selected from amines, acids, acid anhydrides, phenols, alcohols and thiols is employed. In some embodiments, the fly ash is mixed with the epoxy resin in water and ethanol (80:20 water:ethanol), and, while mixing, the curing agent is added. In other embodiments, the fly ash is mixed with the curing agent in water, and, while mixing, the epoxy resin is added. The weight ratio of curing agent and epoxy resin to solvent can be selected as described above, and the curing agent and epoxy resin to fly ash weight ratio ranging as provided above whether for agglomerate formation or structural composite formation. The curing agent and epoxy resin react to form a crosslinked polymer network. This can occur with or without the application of heat, depending on the epoxy resin and curing agent employed.

In some such embodiments, a surfactant is employed with the benefit that the nitrogen-containing polymer network is better distributed on the surface of the mixed oxide fly ash particles. In some such embodiments, the surfactant is selected from-poloxamers.

In a specific embodiment, the coating component includes polyethylenimine and poly vinyl alcohol, and the additive component includes an aldehyde curing agent, in some embodiments glutaraldehyde. The coating component and fly ash are mixed in water, with the coating component:water weight ratio being selected as broadly as defined above; and the coating component; fly ash weight ratio ranging as provided above whether for agglomerate formation or structural composite formation. In some embodiments, the fly ash is mixed with the coating component in water, and, while mixing, the curing agent is added. In other embodiments, the fly ash is mixed with the curing agent in water, and, while mixing, the coating component is added. In some such embodiments the heat is raised gradually to the appropriate heat activation temperature for facilitating the cross-linking reaction.

In light of employing an aqueous coating solution, it is necessary in some embodiments to alter the agents to be a water soluble. For example, epoxy resin is typically not water soluble, and forms suspended particles of a few micrometers in water. This limits the ability to cross link with, for example, amine molecules, on the fly ash surface in an aqueous environment. To overcome the solubility problem of epoxy resin and other water-insoluble reagents, they are converted to water-soluble components by reacting them with a water-soluble molecule.

In a specific embodiment, epoxy resin is first reacted with tetraethylene pentamine (TEPA) to form an epoxy-TEPA oligomer/prepolymer. A high ratio of amine functional groups provides a highly water-soluble coating component (epoxy-TEPA).

In a specific embodiment, water-soluble oligomers are prepared by reacting TEPA with an acid in appropriate stoichiometric amounts. Both citric acid and TEPA are water-soluble, and can be mixed with fly ash particles, and upon evaporation of water, the citric acid will cross link the TEPA molecules to form the cross-link polymer network. Alternatively, TEPA can be deposited on fly ash particles in water, and an addition of citric acid will cross-link the TEPA molecules.

Without wishing to be bound by any particular theory, it is believed that the polymer or crosslinked polymer network either binds to the carbon, binds to the oxide, or simply encapsulates the fly ash particles. As it is the nature of the polymer/crosslinked polymer network to bind and form to itself, it will be appreciated that encapsulated fly ash particles, in composite form, are produced regardless of whether or not there is a chemical bond with the carbon or oxides of the fly ash, and the benefits of this invention are realized.

In light of the foregoing, it should be appreciated that the present invention significantly advances the art by providing a method for preparing composites of polymer and fly ash particles that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Table 1 shows compositions of fly ash and carbon fly ash in weight % determined by EDS (energy dispersive spectroscopy).

TABLE 1

| Element\ Sample | I | II | III |
|---|---|---|---|
| Oxygen (O) | 66.33 | 57.77 | 50.42 |
| Silicon (Si) | 0.01 | 13.23 | 11.24 |
| Calcium (Ca) | 26.6 | 0.72 | 0.58 |
| Carbon (C) | 0.00 | 12.83 | 29.53 |
| Iron (Fe) | 0.00 | 7.24 | 2.58 |
| Aluminum (Al) | 0.01 | 7.83 | 3.58 |
| Sulfur (S) | 6.84 | 0.00 | 0.00 |
| Bromide (Br) | 0.00 | 0.00 | 1.63 |
| Potassium (K) | 0.00 | 0.38 | 0.42 |
| Sodium (Na) | 0.01 | 0.00 | 0.00 |
| Magnesium (Mg) | 0.01 | 0.00 | 0.00 |
| Manganese (Mn) | 0.12 | 0.00 | 0.00 |
| Phosphorous (P) | 0.01 | 0.00 | 0.00 |
| Lead (Pb) | 0.08 | 0.00 | 0.00 |

As shown above, Table 1 lists the compositions of fly ash, medium carbon fly ash and high carbon fly ash with carbon contents varying from 0 to 30%. Arsenic (As) and Selenium (Se), which are the species of major concerns in water pollution, were not detected because their compositions were less than 0.01%. The carbon content in Sample I was beyond the detection limit of EDS. Sample I represents low carbon content fly ash that has been widely used for cement industry. In contrast, Samples II and III are high carbon fly ash were found to have little practical application and have been disposed in landfill.

Example 1

Sample III listed in Table 1 was mixed with MMA (methyl methacrylate) monomer and AIBN (Azobisisobutyronitrile) initiator. The solvent was water, and all were mixed in a vessel at room temperature. Typical concentration of the initiator is less than 0.5 wt. %. In this example, 0.25 wt. % initiator was used. Temperature is gradually raised to 75° C. during mixing. Mixing was required to produce uniform structure. The mixture was kept 75° C. to obtain the final product.

Four final products, herein termed class I, II, III, and IV were obtained. Each class is generally characterized as follows:

Class I—Composite fly ash with a sub-micrometer thickness of thin polymer film for (i) reduction of water use in dust control and (ii) sequestration of heavy metal leachates in landfill disposal and mine reclamation. These had a polymer/fly ash weight ratio of 1:50.

Class II—Composite fly ash particles of 200-300 micrometers in diameter as a filler in paving for road construction. These had a polymer:fly ash ratio of 1:33.

Class III—Low strength, light weight composites having a polymer:fly ash ratio of 1:3. These showed a compressive strength of 5 MPa.

Class IV—High strength, light weight composites having a polymer:fly ash ratio of 1:2. These showed a compressive strength of 20 MPa.

Initial ratio of monomer to fly ash (i.e., high carbon fly ash) can be considered to be the same as the ratio of polymer to ash in the final products.

In general, the carbon surface is more hydrophobic (i.e., less hydrophilic) than oxide surfaces on high carbon fly ash particles. SEM micrographs showed polymers were intimately adhered on to the carbon surface, leaving the oxide surface intact. The polymer, in addition to adhering to the carbon, surrounds the carbon fly ash, providing a hydrophobic layer to limit diffusion of water and metal ions in water.

The chemical bonds also imparted the high mechanical strength to the polymer/fly ash composites.

Example 2

The polymer-FA (i.e., polymer-fly ash) samples with less than 5 wt. % of polymer formed agglomerates. Two polymer-FA samples were prepared by the method described in Example 1 with the final composition of 2 wt. % and 3 wt. % polymer in the composites, respectively. This process of MMA polymerization with FA reduces the percentage of fine fly ash particles passing through a 0.1 mm sieve from 80% to less than 4% for polymer-FA particles, as shown in FIG. 1, changing the physical characteristics of fly ash from a dust to a fine sand. The results of a TCLP (Toxicity Characteristic Leaching Procedure) test revealed that these samples did not leach out heavy metal species except Selenium.

Example 3

In a SEM (scanning electron microscopy)/EDS of fly ash, the composition and structure of fly ash was determined. It was determined that the spherical particles, which were embedded in the fly ash particles, consisted of oxides of Fe, Si, Al, and Ca. Carbon was also observed in an irregular form. A 0.5% polymer-FA was prepared with mixing 10 g of FA, 0.06 g of TEPA (tetraethylene pentamine), 0.012 g of EOPN826 and 4 g of ethanol. EPON826 is a bisphenol A epoxy resin from Hexion. Another sample was prepared with the same composition with an addition of 0.1 mg of P-123 (Pluronic P-123 surfactant). The polymer-FA mixture was heated at temperature above 70° C. for more than an hour to initiate the reaction of epoxy function group in EPON826 and amine functional group of TEPA. This reaction is a curing reaction producing a —CH2-CH(CH2OH)—NH—CH2 linkage between amine molecules (TEPA) and epoxy molecules. The resultant polymer contains a N element. It was shown that metal oxides, such as Fe, Si, Al, and Ca oxides, were in the spherical form embedded in the fly ash particles. Results of SEM (scanning electron microscopy) analysis showed N does not distribute on spherical particles on the sample prepared without P-123. With P-123, N was able to distribute on spherical particles. This example showed unambiguously the addition of a surfactant allowed distribution of N-containing polymer on the surface of mixed oxide particles.

Example 4

Fly ash was mixed in KBr aqueous solution to coat an arbitrary amount of KBr on the surface of fly ash particles. A high concentration (i.e., 1-5%) of KBr was added on the surface to serve as a surrogate of many different forms and types of water soluble metal ions on the FA surface. An effective polymer film on the FA surface will inhibit leaching of concentrated KBr to water. A 0.9 wt. % polymer-fly ash (1:1100 of polymer to fly ash ratio) was prepared with 10 g of fly ash containing KBr, 0.003 g of PEI (polyethylenimine), 0.004 g of glutaraldehyde, 0.0014 g of PVA (polyvinyl alcohol), and 8 g of water. The mixture was cured at temperature above 80° C. for more than 1 hr. XRF analysis of water was used to leach KBr on the surface of fly ash and polymer-fly ash particles. The results showed 1:1100 polymer-fly ash sample did not allow K to be leached out. A minute amount of K was leached out from 1:2300 polymer-fly ash sample. The polymer-fly ash sample in this example is classified as class I composites. The application of this type of monomers, curing agent, and additives allows a significant reduction in (i) water use in dust control and (ii) leachate in landfill disposal and mine reclamation.

Example 5

It is highly desirable to use water as a solvent for achieving encapsulation of particles with polymer. Epoxy is a curing agent which polymerizes or crosslinks polymer that is not water-soluble. EPON826, an epoxy, forms suspended particles of a few micrometers in mean diameter in water. The inability of epoxy to dissolve in water limits its ability to effectively crosslink amine molecules on the FA surface in an aqueous environment. To overcome the solubility problem of epoxy and other water-insoluble crosslinking agents, Epoxy and TEPA were first mixed in an ethanol solution to produce an Epoxy-TEPA oligomer. This oligomer contained a few units of Epoxy-TEPA monomers of which solubility in water is determined the number of amine functional group on the unit. High ratio of TEPA to Epoxy leads to a highly water soluble oligomer. Use of TEPA-Epoxy with a weight ratio of 1:3 produced an oligomer with low solubility in water. Adding MMA to form a weight ratio 2:1:3 for TEPA-Epoxy-MMA produced a water-soluble oligomer. This oligomer produced in ethanol/water solution should be further diluted in water solution with in a few hours. A longer sitting time lead to the formation of undesirable high molecular Epoxy-TEPA polymer gel in ethanol solution. In this study, fly ash was impregnated with 5% KBr. Fly ash with KBr was further mixed with TEPA/water and then the oligomer solution with less than 1% Span80. Span80 is non-ionic surfactant which allows oligomer to spread uniformly on the fly ash. The ratio of fly ash to adding monomer was 1000:1. Following heating of the mixture of oligomer/surfactant/fly ash/KBr at a temperature above 100° C., agglomerated particles which were impermeable to K resulted.

Example 6

Water soluble oligomers were prepared by citric acid and TEPA at the ratio of 1 to 3 in water. Both citric acid and TEPA are soluble in water. The oligomer with water are coated on the surface of 304 stainless steel evaporation of water allowed oligomers to further convert it to polymer network, forming a polymer thin film. The thin film was able to maintain its chemical structure at 200° C. as determined by infrared spectroscopy. Alternatively, TEPA can be deposited on a surface with water, following by addition of citric acid to cross-link the TEPA molecules on the surface. This example shows utilization of both water-soluble monomers and cross linking agents in two different ways to produce polymer thin films for encapsulation.

Example 7

The size of polymer/FA agglomerate was found to be controlled by adjusting concentration of the coating components in an aqueous solution. Polymer/FA were prepared from PEI (polyethylenimine), glutaraldehyde, and PVA (polyvinyl alcohol), water, and FA. The molar ratio of PEI/GA/PVA was 0.44/25/1. Three samples were prepared with 10 g of FA, 4.23 g of water, and a corresponding amount of PEI/GA/PVA to reach the specific weight ratio of polymer/FA. It was shown that the fresh FA particles were in the form of aggregates with the particle size less than 5 μm. Polymer/FA form a larger aggregates. Polymer/FA with 1:1100 were prepared with aqueous solution containing 0.052 wt. % coating component (i.e., PEI, glutaraldehyde, and PVA); PVA/FA with 1:2300 were from a solution with 0.026 wt. % coating component. Use of higher concentration of coating components was found to lead to larger sizes of polymer/FA aggregates.

What is claimed is:

1. A method for preparing composites of polymer and fly ash particles, wherein the fly ash particles contains heterogeneous compositions of carbon and metal oxides, the method comprising the steps of:
   mixing the fly ash particles and an aqueous coating solution including:
      a coating component selected from the group consisting of monomers, oligomers, pre-polymers, polymers, and combinations thereof, and
      an aqueous solvent serving to dissolve the coating component; and, while performing said step of mixing,
   initiating polymerization or crosslinking or both polymerization and crosslinking of the coating component to at least partially coat the fly ash particles with polymer or a crosslinked polymer network that agglomerates the fly ash particles and coats the surface of the fly ash particles.

2. The method as in claim 1, wherein the fly ash particles have a carbon content of 0.75 wt. % or more.

3. The method as in claim 1, wherein the fly ash particles have oxides selected from the group consisting of (i) SiO2, (ii) Al2O3, (iii) MgO, (iv) CaO, (v) BaO, (vi) SexOy, and (vii) AsxOy.

4. The method as in claim 1, wherein the fly ash particle a mean particle diameter of less than 1 micrometer.

5. The method as in claim 1, wherein the coating component is selected from methylmethacrylate, epoxy resin, dialdehydes, polyamine, polyvinyl alcohols; and dicarboxylic/tricarboxylic acid, polyalcohol, and polyols.

6. The method as in claim 1, wherein the aqueous coating solution further includes one or more additive components selected from the group consisting of initiators, catalysts, and curing agents serving to effect said step of initiating.

7. The method as in claim 6, wherein the initiators are selected from the group consisting of azo-initiators, peroxides, and hydroperoxides.

8. The method as in claim 6, wherein the catalysts are selected from the group consisting of (i) tertiary amine for the diamine-epoxy reaction (ii) acid for the reaction of dialdehydes with polyamine and polyvinyl alcohols; and for the reaction of dicarboxylic/tricarboxylic acid with polyamine, polyalcohol, polyols, and polyvinyl alcohols.

9. The method as in claim 1, wherein the curing agents are selected from the group consisting of diamines for epoxy, dialdehydes for polyamine and polyvinyl alcohols, dicarboxylic and tricarboxylic acid for polyamine, polyalcohol, polyols, and polyvinyl alcohols.

10. The method as in claim 1, wherein the aqueous coating solution further includes a surfactant that increases the wettability of the coating component on the fly ash particle.

11. The method as in claim 1, wherein the molar concentration of the coating component in the aqueous solvent is less than 50 wt. %.

12. The method as in claim 1, wherein the aqueous solvent is ethanol and water, with ethanol concentration less than 20%.

13. The method as in claim 1, wherein the polymer or crosslinked polymer network formed in said step of initiating is hydrophobic.

14. The method of claim 1, wherein said step of initiating forms a first composite, the method further comprising the steps of:
   mixing the first composite and an aqueous coating solution including:
      a coating component selected from the group consisting of monomers, oligomers, pre-polymers, polymers, and combinations thereof, and
      an aqueous solvent serving to dissolve the coating component; and, while performing said step of mixing,
   initiating polymerization or crosslinking or both polymerization and crosslinking of the coating component to at least partially coat the first composite with polymer or a crosslinked polymer network that agglomerates the first composite and coats the surface of the first composite.

* * * * *